US011805935B2

(12) United States Patent
Chioda et al.

(10) Patent No.: US 11,805,935 B2
(45) Date of Patent: Nov. 7, 2023

(54) MULTI-SERVE AIRTIGHT COFFEE DISPENSER

(71) Applicant: SOCIETE DES PRODUITS NESTLE S.A., Vevey (CH)

(72) Inventors: Sergio Chioda, Lausanne (CH); Martino Ruggiero, Lonay (CH); Marco Restelli, La Tour-de-Peilz (CH); David Quero, Azzano San Paolo (IT); Riccardo Calvi, Camogli (IT)

(73) Assignee: Societe des Produits Nestle S.A., Vevey (CH)

( * ) Notice: Subject to any disclaimer, the term of this patent is extended or adjusted under 35 U.S.C. 154(b) by 500 days.

(21) Appl. No.: 16/956,689

(22) PCT Filed: Dec. 14, 2018

(86) PCT No.: PCT/EP2018/084926
§ 371 (c)(1),
(2) Date: Jun. 22, 2020

(87) PCT Pub. No.: WO2019/121385
PCT Pub. Date: Jun. 27, 2019

(65) Prior Publication Data
US 2020/0390270 A1    Dec. 17, 2020

(30) Foreign Application Priority Data
Dec. 22, 2017    (EP) ..................................... 17210548

(51) Int. Cl.
*A47J 31/40* (2006.01)
*A47J 31/52* (2006.01)
*A47J 31/36* (2006.01)

(52) U.S. Cl.
CPC ......... *A47J 31/404* (2013.01); *A47J 31/3628* (2013.01); *A47J 31/3633* (2013.01); *A47J 31/52* (2013.01)

(58) Field of Classification Search
CPC .................................................... A47J 31/3628
See application file for complete search history.

(56) References Cited

U.S. PATENT DOCUMENTS 7,562,793 B2    7/2009  Ufheil et al.
9,131,799 B2    9/2015  Kamerbeek et al.
(Continued)

FOREIGN PATENT DOCUMENTS

| DE | 10147284 | 4/2003 |
|---|---|---|
| DE | 202005021174 | 6/2007 |

(Continued)

*Primary Examiner* — John J Norton
(74) *Attorney, Agent, or Firm* — K&L Gates LLP

(57) ABSTRACT

The present invention relates to a dispensing device (10) for dispensing a food product from a exchangeable multi-dose container (1), the device comprising a support (9) for removably supporting the container (1), a sealable dosing chamber (4) for receiving, dosing and holding a dose of food product dispensed from the container (1), oxygen reducing means (5) designed for reducing oxygen level in the dosing chamber (4), characterized in that the device further comprises at least one piston (7) arranged to move relatively to the support (9) of the device, and configured to at least partially enclose the dosing chamber (4) in an initial sealingly engaged position of the piston with the support (9), the piston (7) being designed for selectively opening the container (1) by moving relatively to the support (8) and for enabling the dosing chamber (4) to be charged with the dose of food product in an extended and sealingly disengaged position of the piston (7) relative to the support (9).

16 Claims, 6 Drawing Sheets

(56) References Cited

U.S. PATENT DOCUMENTS

| | | |
|---|---|---|
| 9,763,535 B2 | 9/2017 | Colleoni |
| 10,561,266 B2 | 2/2020 | Rijskamp et al. |
| 2001/0052294 A1* | 12/2001 | Schmed .............. A47J 31/3623 99/302 R |
| 2002/0110626 A1 | 8/2002 | Buckingham et al. |
| 2006/0130665 A1 | 6/2006 | Jarisch et al. |
| 2007/0044665 A1* | 3/2007 | Kirschner ............... G01F 11/18 99/280 |
| 2007/0181003 A1 | 8/2007 | Bardazzi |
| 2008/0197148 A1* | 8/2008 | Illy ......................... A47J 47/01 99/279 |
| 2011/0185908 A1* | 8/2011 | Berto ...................... G01F 11/24 222/71 |
| 2012/0199011 A1 | 8/2012 | Cheng |
| 2015/0344285 A1* | 12/2015 | Joseph ............... A47J 31/3676 222/173 |
| 2016/0029832 A1* | 2/2016 | Iotti .................... A47J 31/3642 221/199 |
| 2018/0020867 A1 | 1/2018 | De'Longhi et al. |

FOREIGN PATENT DOCUMENTS

| | | |
|---|---|---|
| EP | 1163869 | 12/2001 |
| GB | 1013110 A | 12/1965 |
| WO | 2008037642 | 4/2008 |

\* cited by examiner

Fig. 4d
Fig. 4e
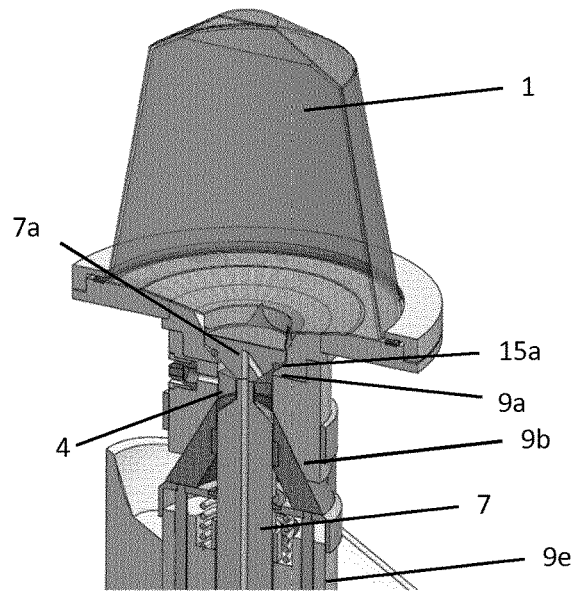
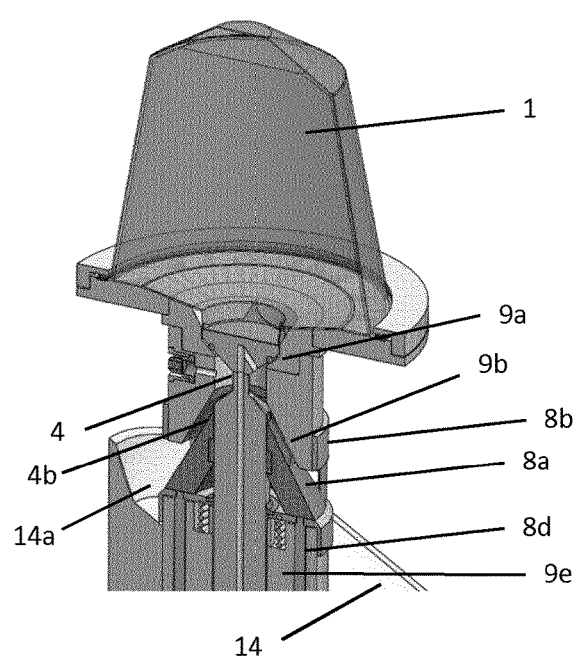

MULTI-SERVE AIRTIGHT COFFEE DISPENSER

CROSS REFERENCE TO RELATED APPLICATIONS

The present application is a National Stage of International Application No. PCT/EP2018/084926, filed on Dec. 14, 2018, which claims priority to European Patent Application No. 17210548.8, filed on Dec. 22, 2017, the entire contents of which are being incorporated herein by reference.

FIELD OF THE INVENTION

The present invention relates to a multi-serve coffee dispenser for holding coffee ingredients in an airtight manner and for selectively dispensing a portion of the coffee ingredients held therein.

BACKGROUND OF THE INVENTION

Devices for dispensing a food product from a supply or a container are well-known. A common example are coffee powder dispensing devices comprising a grinder for grinding coffee beans and a storage chamber for receiving a bulk of coffee beans that may be selectively ground and dispensed from the device. These dispensing devices suffer the disadvantage that the bulk of coffee beans, which is usually packed in flow wrapped or can-type packages under inert gas such as nitrogen, will undergo oxidation due to its contact with air once the coffee beans are provided to the storage chamber of the device. This leads to a negative influence on the organoleptic properties of the beverage obtained from the coffee beans. This negative influence is even larger in case ground coffee is fed into a storage chamber of the dispensing device due to the relatively larger surface of the coffee particles.

In order to address this issue, dispensing devices are known which are designed to feed inert gas into a storage chamber or container connected to the device in order to provide a protective atmosphere with lower amount of oxygen therein.

GB 2467917 for example relates to a coffee grinding device designed for receiving a container with coffee beans which is connected in an air tight manner to a housing of the grinding device. The container may be flushed with inert gas to re-establish a protective atmosphere which is destroyed by the opening of the container. For this purpose, a gas canister is provided with an electronic control valve, a tubing and an inlet. An air or gas vent is provided in the container to balance the pressure inside the container as inert gas is flushed in. The device is thus enabled to keep the coffee beans under protective atmosphere by re-flushing the container with gas each time the grinding machine is used.

US 2011/0185908 relates to a dosing device for a food product such as coffee beans or ground coffee from a container that can be associated with the dosing device. The dosing device comprises a rotary dosing element which rotates from a coffee charging position, in which a portion of the food product is provided from the container to a chamber of the dosing element via an inlet thereof to a coffee dispensing position, in which the food product portion will leave the chamber via an outlet thereof. Inert gas can be introduced in the chamber of the rotary dosing element after dispensing of the food product.

EP1879487B1 relates to a coffee dispenser including a storage container provided with an outlet nozzle closed by a sliding shutter, a dispensing chamber arranged under the storage container, connected thereto through the outlet nozzle and provided at the bottom with a dispensing nozzle closed by a second sliding shutter. Both the storage container and dispensing chamber are air-tightly sealed by sealing means suitable to resist the osmotic pressure caused by the different in moisture content between the inside of the dispenser and the surrounding environment. Furthermore, vacuum means may be provided to remove oxygen from the storage chamber after dispensing of coffee to the dispensing chamber and to remove oxygen and moisture from the dispensing chamber after dispensing of the coffee from the dispensing chamber. Inert gas injection means can also replace the vacuum means.

EP1876936B1 related to a dispenser including a rigid container provided with a lid and an outlet nozzle closed by a shutter means wherein the container is airtight and arranged at an angle between 10° and 90° upward with respect to the horizontal with the outlet nozzle on top of the container. Furthermore, dispensing and storage volume reduction means are provided in the dispenser.

The known prior art devices suffer the disadvantages that a relatively large amount of inert gas is required for establishing and maintaining the controlled atmosphere in the container and/or a complex dispensing arrangement is necessary for enabling dispensing of the food product from the container.

The present invention therefore aims at providing a dispensing device for enabling an efficient and convenient dispensing of food product from a container with facilitated means while preserving the food product in the container in a protective atmosphere.

SUMMARY OF THE INVENTION

In a first aspect, the invention relates to a dispensing device for dispensing a food product in powder form from an exchangeable multi-dose container, the device comprising:
  a support with a seat for removably supporting the container,
  a sealable dosing chamber for dosing and holding a dose of food product dispensed from the container,
  oxygen reducing means designed for reducing oxygen level in the dosing chamber,
wherein the device further comprises at least one piston arranged to move relative to the support of the device, and configured to at least partially enclose the dosing chamber in an initial sealingly engaged position of the piston with the support, the piston being designed for opening the container by moving relative to the support and for enabling the dosing chamber to be charged with the dose of food product in a sealingly disengaged position, and preferably extended position, of the piston relative to the support.

More particularly, the first piston is sealingly engaged with a first wedge or cone-shaped surface of the support. This first wedge or cone-shaped surface preferably widens in direction of the seat of the support. This has the further advantage to provide a funneling of the powder in the dosing chamber.

Preferably, the piston is arranged to move along a substantially vertical axis such as, after opening of the container, food product can flow in the dosing chamber at least by influence of gravity. A substantially vertical axis is an axis purely vertical or inclined of an angle smaller than 45 degrees relative to vertical.

The oxygen reducing means preferably comprises injection means designed for injecting a protective gas such as inert gas into the dosing chamber. Alternatively, the oxygen reducing means may be means for drawing vacuum in the dosing chamber.

Preferably, the device further comprises a second piston axially moveable relative to the first piston. The second piston is preferably designed for selectively dispensing the dose of food product from the dosing chamber in a sealingly disengaged preferably retracted position of the second piston relative to the support or relative to the first piston. The second piston is preferably designed to move between a sealingly engaged position with the support to the sealingly engaged preferably retracted position with the support. More particularly, the second piston is sealingly engaged with a second a wedge or cone-shaped surface of the support. The second wedge or cone-shaped surface preferably narrows widens in direction of the seat of the support. This provides the advantage to keep the dosing chamber sufficiently small to minimize the oxygen reduction.

The device according to the invention enables an efficient protection during storage of the food product within the container from which the respective doses of food product may be dispensed due a dedicated sealable dosing chamber such that the container itself does not have to be provided or even flushed with protective (e.g. inert) gas after each dispensing process. Furthermore, the provision of first and second axially moving pistons enables a particular simple and reliable structure of the dispensing device in which the respective moving parts may be actuated by actuator means. The claimed arrangement also enables a convenient actuation of a plurality of dispensing devices, arranged e.g. next to each other, by means of a common actuator means connected to the dispensing devices.

In a preferred embodiment, the first and second pistons are designed for being axially moved independent from each other and/or alternately by dedicated actuator means. The first and second piston elements are preferably designed for being actuated by a common actuator means.

The first and second pistons are preferably designed for enclosing the sealable dosing chamber in their initial biased positions within a guiding channel of preferably tubular form of the support.

The first and second pistons are respectively biased or engaged against an upper seat and lower seat of the support in a sealed manner such as to enclose the dosing chamber. Biasing of the respective first and second pistons is preferably obtained by dedicated biasing means such as e.g. spring member(s).

The first and second pistons are preferably designed to selectively open a food product flow path between the dosing chamber and the container respectively between the dosing chamber and a dispensing area of the device. This is preferably obtained by bringing the first piston from its initial biased position into its extended position respectively by bringing the second piston from its initial biased position into its retracted position.

The first piston is preferably an inner piston that is axially movable through a guiding channel of the second piston. Preferably, at least a lower base portion of the first piston is movable within the guiding channel of the second outer piston and/or within a guiding channel of the support. The respective inner diameters of the guiding channel of the support and the guiding channel of the second outer piston are preferably of substantially equal dimensions.

The first piston preferably comprises or is associated with to an opening member protruding from or forming a top portion of the piston and which are designed to open a discharge wall of the container. Preferably, the opening member and the first piston are moved concomitantly axially relative to the container such as to create at least one opening. The opening member can be the moving part and the discharge wall of the container can be stationary. Conversely, the opening member can be the stationary part and the discharge wall can be the moving part. Finally, the opening member and the discharge wall can both be moving parts during the opening operation. Opening of the face of the container may be obtained by at least partially perforating, piercing, tearing, melting, breaking and/or cutting the face of the container. It is understood that the term "opening" may encompass one or more orifices or passages such as by means of perforation, cutting, tearing, breaking, melting and any combination thereof.

The top portion of the first piston is preferably formed by an inverted conical head that is biased against a conformally shaped inverted conical top seat of the support in the biased position of the first piston. The top portion may however comprise alternative geometrical forms which are biased against a conformally shaped top seat of the support.

The first piston preferably further comprises an annular recess arranged between the top portion and the base portion of the piston. The annular recess preferably at least partially delimits the dosing chamber. The annual recess preferably comprises an upper and lower slanted portion.

The first piston further comprises the injection means such as a gas conduit. The gas conduit may extend through the piston and be in fluid communication with an annular recess of the piston. Accordingly, a fluid communication between the injection means and the dosing chamber is provided. The gas conduit preferably extends axially through the piston and is preferably connected to a gas source such as an exchangeable gas reservoir of the device. The gas conduit may be arranged to extend towards an outer lateral surface of the top portion of the first piston facing the dosing chamber respectively the annular recess of the first piston.

The second piston preferably comprises a top portion that is formed by a conical head that is biased against a conformally shaped conical lower seat of the support in the biased position of the second piston. The top portion may however comprise alternative geometrical forms which are biased against a conformally shaped lower seat of the support.

As described above, the second piston further comprises a guiding channel in which the first piston is mounted and in which the first piston is axially movable. The guiding channel may extend throughout the whole second piston, i.e. from the top portion thereof towards a lower base portion of the piston. The second piston may be guided in dedicated guiding means of the support.

The first and second pistons, the support as well as the seat of the device are preferably arranged such as to enable the flow of food product within the device by effect of gravity. For this purpose, the seat of the device is preferably arranged at a top most portion of the device and the support and the first and second piston as well as the dosing chamber are preferably arranged below the seat of the device. A dispensing area of the device is preferably arranged at a lower portion of the device compared the rest of the above-indicated parts.

The support of the device preferably comprises a cylindrical element that may be formed by a housing of the dispensing device.

The support may further comprise a seat arranged for supporting and holding the exchangeable container in a predetermined position in such a manner that the discharge wall is positioned adjacent or close to the opening member of the device.

The support preferably comprises an over-pressure valve for allowing excess air or gas to be flushed out of the sealable dosing chamber. The over-pressure valve is thus arranged in a sidewall of the support between the guiding channel of the support and the external surrounding of the device.

The sealable dosing chamber is preferably designed such that in the closed state of the chamber, i.e. at the biased position of the first and second pistons, any ingress of oxygen into the chamber is substantially prevented. For this purpose, the materials of the first and second pistons as well as of the support, which parts delimit the dosing chamber in the biased position of the first and second piston, are chosen such as to substantially prevent any transmission of oxygen through the respective parts.

The first and second pistons and/or the respective seats of the support preferably comprise sealing means such as an O-ring for enabling a sealing of the sealable dosing chamber within the support in the biased position.

In a preferred embodiment, the device further comprises connection means for sealingly connecting at least one face of the container to the seat of the device. The connection means may comprise an annular sealing gasket which may be selectively connected to a conformally shaped closing element such as a pressure ring. The sealing gasket and the closing element may be designed to sealingly engage with an outer boundary portion of a discharge wall of the container such as e.g. a flange-like rim arranged at the circumference of a container discharge wall. In the connected state, the container is preferably hermetically sealed to the device (i.e., without possibility of gas escaping the container other than through the dosing chamber).

The device preferably further comprises a dispensing area from which the user of the device may collect the dispensed dose of food product. The dispensing area may comprise a slide, chute and/or a receptacle selectively connectable to the dosing chamber. The dispensing area of the device is subject to ambient air.

The gas to be provided by the injection means to the dosing chamber is preferably inert gas such as nitrogen. By provision of the inert gas to the sealable dosing chamber a protective atmosphere with no oxygen or with a very low content of oxygen is provided in the dosing chamber.

The exchangeable multi-dose container for being used in conjunction with the device according to the invention is arranged with a quantity of food product in powder form able to deliver a plurality of dosed amounts of food product. Preferably, the container contains roast-and-ground coffee powder. The coffee powder can be formed of loose powder and/or of compacted powder pellets. The food product is preferably free of over-packaging or non-food envelop. It is not portioned in the container into portions having a volume equal or bigger than the volume of the dosing chamber. Most preferably, the food product is formed of roast-and-ground powder having particle mean diameter ($D_{4,3}$) comprised between 150 and 1000 micrometers. The container is preferably an exchangeable package made of rigid, semi-rigid and/or flexible packaging material(s). It is arranged with an openable wall to be opened by the device when arranged in conjunction with the device. The container is preferably a sealed container made from a material which essentially prevents the ingress of oxygen into the interior thereof, such as e.g. aluminum or plastic with oxygen barrier. The sealed container preferably comprises a body and a wall attached thereto which is unsealable, e.g., pierceable, tearable, cuttable, meltable or breakable wall so as to enable the dosing of food product from the container to the dosing chamber of the device. The container may be a sealed exchangeable capsule, pouch or cartridge. In a preferred mode, the container is a multi-dose capsule comprising an essentially cup-shaped body portion and a lid portion connected to the body portion by means of an annular flange-like rim. The lid portion preferably presents the face of the container which is connectable to the seat of the dispensing device. The lid preferably comprise a thickness such as to be openable by the opening means of the device.

The container for being used with the device preferably comprises ground coffee in an amount suitable for preparing multiple beverages therefrom. The container is preferably initially filed with inert gas such as nitrogen.

The invention further relates to a combination of at least two or more dispensing devices as aforementioned, wherein the dispensing devices are arranged next to each other and are actuated by a common actuator. The actuator may be arranged for actuating at least one piston or first and second pistons of each dispensing device.

The invention further relates to a combination of the dispensing device as aforementioned and an exchangeable multi-dose container; the container being supported on the seat and/or support of the device. The container more particularly comprises a product discharge wall which is openable by the moveable piston, in particular an opening member associated or part of the piston. The discharge wall is positioned adjacent or close to the opening member of the device.

The invention further related to a beverage machine comprising at least one dispensing device as aforementioned.

Preferably, the beverage machine comprises a brewing unit for receiving the dose of food product in powder form such as roast and ground coffee. The machine may further comprises a control unit for controlling the actuation of the actuating means of the dispensing device. The control unit may be arranged for repeatedly controlling the actuating means for adjusting the number of doses dispensed to the brewing unit according to a selection of beverage type received by the control unit. In particular, the control unit may be programmed for actuating the dispensing device repeatedly for dispensing one, two, three or more doses of food product for the preparation of a beverage. Therefore, the machine automatically adjusts the number of doses of food product to the beverage type as preferably stored in the machine. In particular, the control unit stores beverage types (or recipes) and sets of instructions related thereto; each type and set of instructions corresponding to a defined natural whole number of doses of food product (e.g., n=1, 2 or 3, etc.). The beverage type can be selected from a user interface of the machine or remotely via an external communication device (e.g., mobile phone or computer) able to communication with the machine (via wire or wirelessly).

It is therefore possible to prepare by extraction in the brewing unit different coffee beverage types such as espresso, latte-macchiato, double-lungo by respectively dispensing for instance two, three or four doses of roast and ground coffee powder from a dosing chamber of a storage capacity capable of receiving a few grams (e.g. about 3 grams) of loose coffee powder.

The food product in the container is preferably roast-and-ground coffee powder. Other food products in powder form can be milk, cocoa, fruit concentrate, energy drink, infant formula, soluble tea or coffee and combinations thereof. The powder has a mean particle diameter ($D_{4,3}$) between 150 and 1000 microns. The powder can be mixed with other constituents such as fibers, flakes, pieces and the like.

In a further aspect, the invention relates to a method for dispensing a dose of food product from a container comprising the steps of:
- providing a dispensing device as described above,
- reducing oxygen of the dosing chamber of the device,
- moving at least one piston from its initial sealingly engaged position to its sealingly disengaged position relative to the support and preferably extended position towards a discharge wall of the container such as to open the discharge wall of the container and to establish a food product flow communication between the container and the dosing chamber,
- closing the dosing chamber by bringing the first piston back to the initial sealingly engaged position,
- opening the dosing chamber to establish a food product flow communication between the dosing chamber and a dispensing area of the device such as to dispense the dose of food product from the dosing chamber to a dispensing area.

In particular, the reduction of oxygen can be obtained by injecting protective gas (e.g. inert gas) in the dosing chamber or by drawing vacuum.

Preferably, the opening of the dosing chamber is performed by moving a second piston from an initial engaged position relative to the support or first piston to a retracted position relative to the same to establish a food product flow communication between the dosing chamber and the dispensing area of the device such as to dispense the dose of food product from the dosing chamber to the dispensing area.

The flow of food product within the device is preferably obtained by gravity and/or pressure of gas. In particular, the food product is preferably flowing from the container to the dosing chamber and from the dosing chamber to a dedicated dispensing area of the device by effect of gravity. Such can be ensured by having the support of the device placed substantially vertically below the exchangeable container.

The movement of the first piston from its initially engaged position towards its extended position preferably takes place in an upward movement, i.e. towards the seat and thus towards the discharge wall of the container arranged on said seat. This movement is obtained by dedicated actuator means. For moving the first piston back to its engaged closing position, the piston is lowered from its extended position to a retracted position. This movement is obtained by dedicated biasing means.

The movement of the second piston from its initially engaged position towards its retracted position preferably takes place in a downward movement, i.e. away from the container and the dosing chamber. This movement is obtained by dedicated actuator means. For moving the second piston back to its biased position, the piston is lifted from its retracted position to an extended position. This movement is obtained by dedicated biasing means.

The respective movement of the first and second pistons may be obtained by an actuator comprising drive means such as a motor. The actuator may as well comprise a linear actuator and/or a cam shaft. The actuator means at preferably designed for selectively and/or alternately engaging with the first and second pistons.

The method of the invention may further comprise the step of connecting the container to the seat of the dispensing device in a preferably sealed manner. This may be obtained by the provided connection means of the device.

The method may further comprise the step of moving the first piston into an intermediate raised position in which the opening means of the piston do not yet contact the container, but wherein a fluid flow communication between the sealable dosing chamber and the seat of the device is established. In this intermediate raised position, the method may comprise the step of flushing the sealed dosing chamber as well as the area between the dosing chamber and the container with inert gas. Thereby, any remaining oxygen may be expelled via the provided over-pressure valve of the support. This method step may be carried out after connecting a new, i.e. unused and closed, container to the dispensing device.

The description above with respect to the dispensing device according to the invention equally applies to the method according to the invention and vice versa.

DESCRIPTION OF THE FIGURES

The present invention is further described in the following detailed description when taken in conjunction with the below listed figures that show a non-limiting embodiment of the invention. In particular:

FIGS. 4a to 4e relate to perspective sectional side views of the device according to FIGS. 1 to 3, which represent the different positions of the parts and in particular of the first and second pistons during the dispensing process.

DETAILED DESCRIPTION OF EMBODIMENTS

Figure 1:
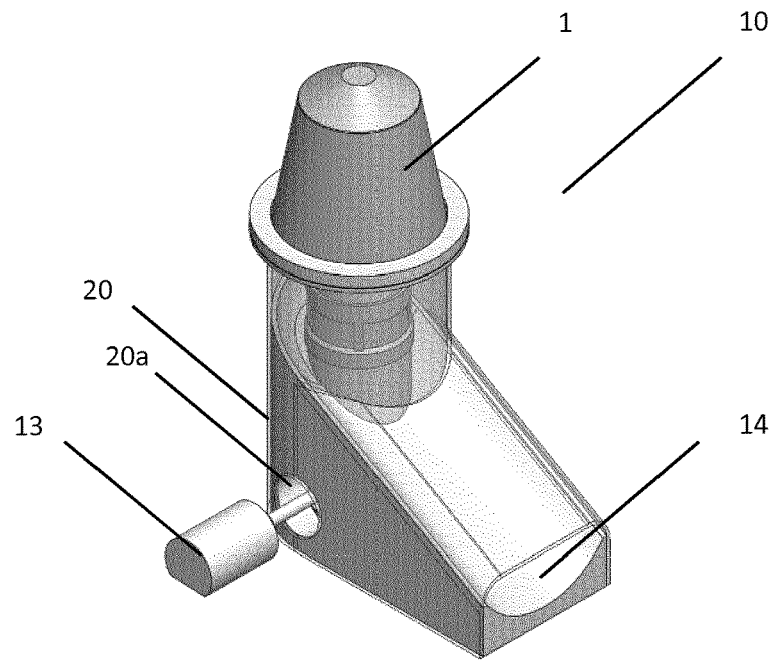
FIG. 1 relates to a perspective side view of a preferred embodiment of the dispensing device.

A preferred embodiment of the dispensing device according to the invention will be described in the following with reference to FIGS. 1 to 3.

The dispensing device 10 comprises a housing 20 having a front portion at which a dispensing area 14 such as a slide for the dispensed food product is provided. A container 1 comprising an amount of food product to be dispensed by the device 10 can be selectively connected to the device. Actuator means 13 are provided in a lower bottom portion of the device 10. The actuator means 13 may comprise a motor and a drive or cam shaft 13a for actuating the device 10 as will be described further below. The actuator means 13 may protrude through a side opening 20a of the housing 20 of the device and may be designed for being selectively disconnectable from the device.

Figure 2:
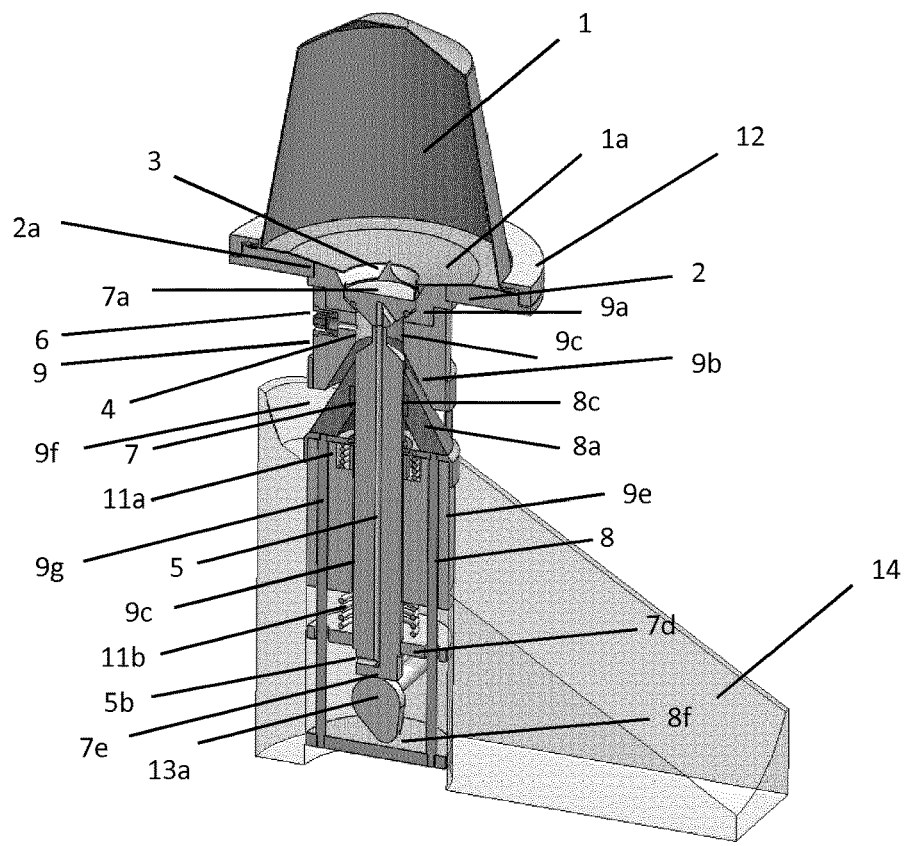
FIG. 2 relates to a perspective sectional side view of the dispensing device of FIG. 1.
Figure 3:
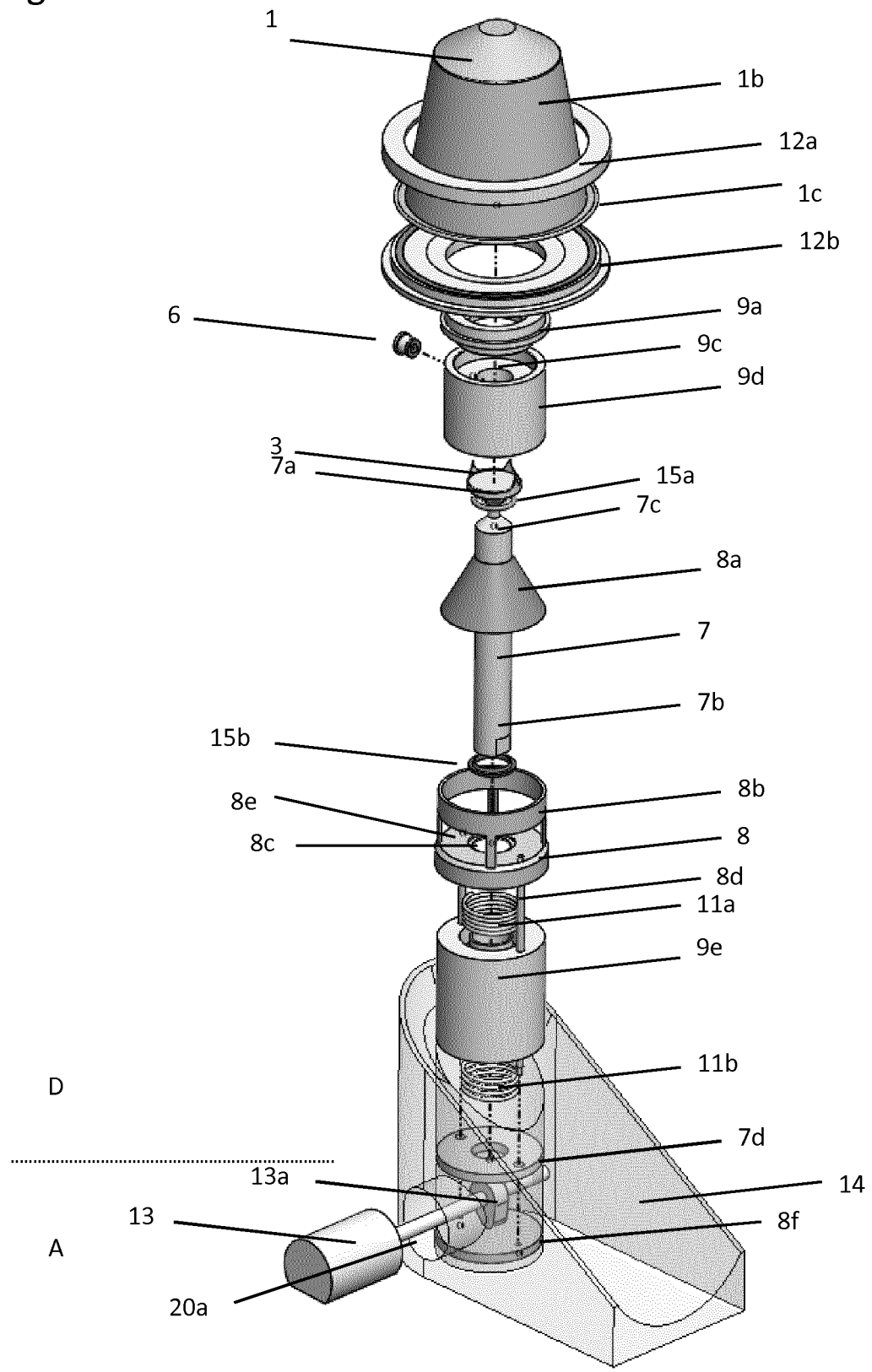
FIG. 3 relates to an exploded assembly drawing of the dispensing device of FIGS. 1 and 2.

As shown in FIGS. 2 and 3, the device 10 comprises a seat 2 for connecting the container 1 to the device. The seat 2 presents a support on which a discharge wall 1a of the container 1 may rest. The support comprises annular connection means 12 for sealingly connecting at least one discharge wall 1a of the container 1 to the device.

The connection means 12 preferably comprises a lower annular sealing gasket 12b and an upper annular pressure ring 12a connectable to each other. The connection may be established e.g. via a bayonet system or a vertically movable pressure ring 12a. The connection means 12 are preferably designed to sealingly engage an outer annular rim portion of the container 1 such as a flange-like rim portion 1c of the container.

The device 10 comprises a support 9 which is preferably fixedly arranged within the housing 20 of the device. The support 9 is preferably of cylindrical shape and comprises an inner guiding channel 9c. The guiding channel 9c of preferably tubular shape extends axially within the support 9. The support 9 comprises an upper part 9d and a lower part 9e. The lower part 9e is preferably arranged within the housing 20 such that a free space 9f is provided between the lower part 9e and the upper part 9d of the support 9.

The upper part 9d of the support 9 comprises an upper seat 9a and a lower seat 9b which are arranged at the respective end portions of the upper part 9d and which are connected by an upper portion of the guiding channel 9c.

Within said upper portion of the guiding channel 9c a valve 6 such as an over-pressure valve is provided. The valve 6 serves the purpose of allowing excess air or gas to exit the guiding channel 9c respectively a sealable dosing chamber 4 enclosed therein.

The seat 2 of the device is connected to a top portion of the support 9 such that the upper seat 9a of the support 9 is in fluid communication with a preferably centrally arranged opening 2a of the seat 2.

The device 10 further comprises a first axially movable piston 7 and a second axially movable piston 8 mounted at the support 9. The first piston 7 is preferably an inner piston arranged and at least partially guided within the second outer piston 8. The first and second piston 8 are preferably arranged concentric to each other and are designed for being moveable in the same linear direction.

The first piston 7 is arranged to be movable within the preferably tubular-shaped guiding channel 9c of the support 9. The second movable piston 8 is preferably arranged to be movable in a dedicated guiding channel or a plurality of guiding channels 9g of the support 9.

The first piston 7 is preferably of essentially cylindrical form and comprises a cylindrical base portion 7b guided in guiding channel 9c and a top portion 7a. The top portion 7a is preferably of inverted cone-shaped form and extends to a larger diameter than the base portion 7b. The piston 7 further comprises a recessed portion or reduced area portion 7c arranged between the top portion 7a and the base portion 7b. The recessed portion 7c preferably comprises slanted circumferential sidewalls at its transitions to the top portion 7a and the base portion 7b.

The top portion 7a of the piston 7 is biased against the upper seat 9a of the support 9. The upper seat 9a is conformally shaped to the top portion 7a and thus in the present embodiment of inverted cone-shaped form. The top portion 7a is equipped with opening means 3 such as a perforating or cutting member which protrudes from a preferably planar upper surface of the top portion 7a. The opening means 3 are designed to open the discharge wall 1a of the container 1.

The first piston 7 further comprises a base plate 7d which is connected to the base portion 7b. The base plate 7d is contacted by a biasing member 11b such as a spring which urges the piston 7 in a downward direction and thus biases the top portion 7a of the piston against upper seat 9a of the support 9, as shown in FIG. 2. A lower end face 7e of the piston presents a contact surface for the actuator means 13. In particular, a dedicated actuation member such as a cam drive 13a of the actuator means 13 may urge the piston 7 into an upwards movement against the force of the biasing member 11b in order to separate the top portion 7a of piston 7 from the upper seat 9a of the support 9.

The first piston 7 further comprises gas injection means 5 designed for providing inert gas into the interior of the guiding channel 9c and thus to the sealable dosing chamber 4. The injection means comprise a preferably axially extending conduit which is connected to the guiding channel 9c at a top portion of the piston 7 via a conduit 5a (see e.g. FIG. 4a). A lower conduit 5b of the injection means 5 is arranged in the base portion 7b of the first piston 7 and may be connected to a dedicated supply source for the inert gas as well as to dedicated valve means which are designed for selectively providing gas to the dosing chamber 4.

The second piston 8 comprises a top portion 8a which is of wedge or cone-shaped form. The piston 8 further comprises a central axial guiding channel 8c, preferably tubular, in which the first piston 7 is guided. The piston 8 further comprises a piston cage 8b which is arranged to surround the top portion 8a and which is designed to engage an outer lateral surface of the support 9 of the device such as to guide the piston 8 during its movement within the device. The piston cage 8b preferably comprises a plurality of lateral openings 8e shaped to allow a flow of the product to be dispensed through the piston cage 8b to dispensing area 14.

Figure 4A:
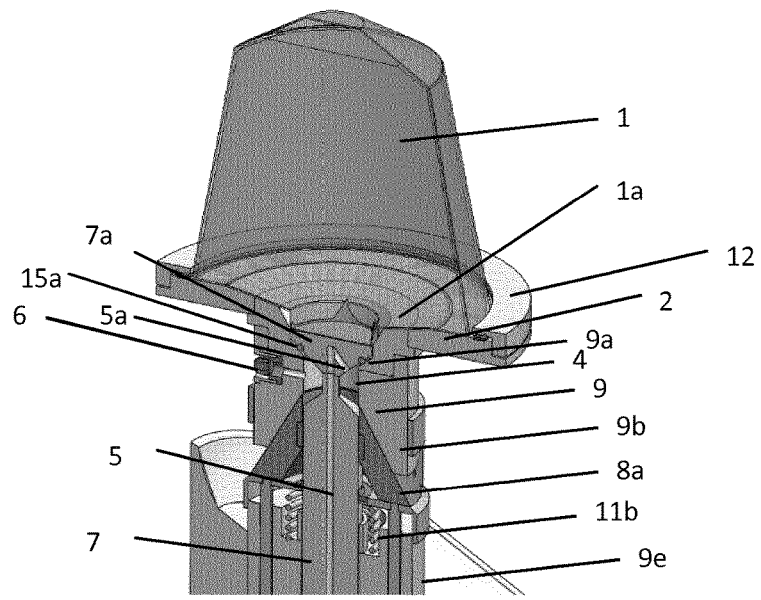

The cage 8b and/or the top portion 8a are contacted at their lower face by a biasing member 11a such as a spring which urges the piston 8 in an upward direction and thus biases the top portion 8a of the piston against a lower seat 9b of the support 9 (see initially biased state of piston 8 in FIG. 4a). The biasing member 11a may be arranged in an annular top groove of the lower part 9e of the support.

The second piston 8 further comprises at least one or a plurality of axial rods 8d connected to the top portion 8a and the cage 8b and which are extending to a lower base plate 8f of the piston 8. The rods 8d are thereby extending through dedicated channels in the lower support 9e and in the base plate 7d of the first piston 7 and which are designed to enable an axial movement of the rods 8d therein.

A upper face of the lower base plate 8f presents a contact surface for the actuator means 13. In particular, a dedicated actuation member such as a cam drive 13a of the actuator means 13 may urge the piston 8 into a downwards movement against the force of the biasing member 11a in order to separate the top portion 8a of piston 8 from the lower seat 9b of the support 9 as indicated in FIG. 2.

As indicated in FIG. 3 the device 10 is preferably constructed such that the dispensing area D is arranged above and separated from the actuation area A. Accordingly, the manufacturing process as well as maintenance of the device are facilitated.

The arrangement of the device enables the independent movement of the first and second piston 7,8 by the actuator means 13. In particular, the arrangement enables a movement of the pistons 7,8 alternately due to the provided cam drive 13a as shown in FIG. 2. Thereby, an extended portion of the cam drive 13a may subsequently engage the lower contact face 7e of the first piston 7 such as to lift the first piston 7, and then engage the upper face of the lower base plate 8f of the second piston 8 such as to lower the second piston 8 after the first piston 7 was brought back to its initially biased position as shown in FIG. 2. The actuation means 13 are preferably designed to bring the first piston 7 into an intermediate extended position, i.e. between its initial biased position and its extended position.

The first and second pistons 7,8 are designed such as to selectively enclose the sealable dosing chamber 4 as will be further described below with reference to FIGS. 4a to 4e, which relate to the different operating states of the device during the dispensing process.

FIG. 4a relates to a state of the device 10 in which the container 1 has already been connected to the device. The container 1 is preferably a hermetically sealed container having a base body 1b and a lid 1a connected thereto, which comprises an outer annular flange-like rim 1c. The container 1 is preferably shaped such as to comprise a predefined amount of food product such as e.g. ground coffee in an amount suitable for preparing a multitude of coffee beverages. The container 1 is connected to the seat 2 via the dedicated connection means 12 which urge the discharge wall 1a against an upper surface of the seat 2. The connection means 12 further seal the container 1 annularly to the support 9 of the device.

The first and second pistons 7,8 are in their initial biased state as shown in FIG. 4a, in which the respective top portions 7a,8a are urged against the upper and lower seat 9a,9b of the support 9. In this state, the dosing chamber 4 arranged below the seat 2 of the device 10 is sealingly enclosed by means of the first and second piston 7,8 and the inner channel 9c. In particular, the top portion 7a, an inner lateral sidewall of the channel 9c and the top portion 8a delimit the sealable dosing chamber 4. For further enhancing the sealing engagement, the top portions 7a,8a of the pistons 7,8 may be equipped with dedicated sealing means 15 such as an O-ring 15a shown in FIG. 4a for the piston 7. The second piston 8 may also comprise a dedicated sealing member 15b as shown in FIG. 3.

Figure 4B:
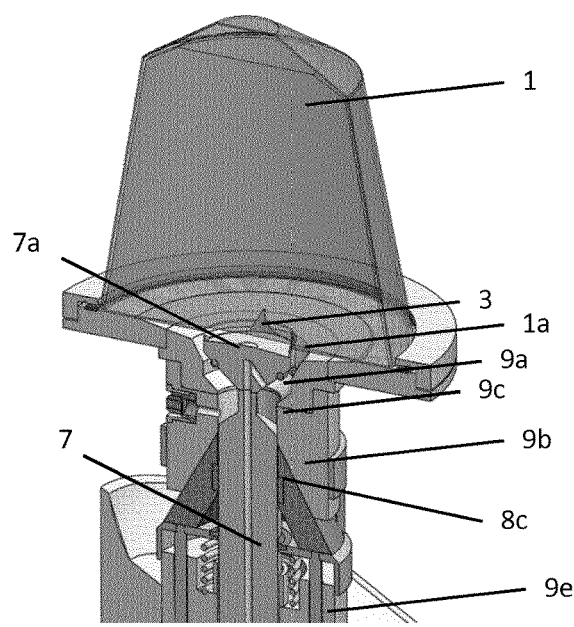

Before opening the container 1, any remaining oxygen will have to be expelled from the upper part of the support 9d and the dosing chamber 4. For this purpose, the first piston 7 is lifted by the actuator means 13 such as to lift the top portion 7a from the upper seat 9a of the support 9 and thus establish a fluid communication between the sealable dosing chamber 4 and the opening 2a of the upper face of the support 2 as shown in FIG. 4b.

At this intermediate position in which the opening means 3 are not yet in contact with the discharge wall 1a of the container, the injection means 5 are activated to provide inert gas such as nitrogen into the dosing chamber 4 via the conduit 5a arranged in a top portion 7a of the piston 7. Thereby, the injection means 5 are preferably activated for a sufficient time period such as to flush out any remaining oxygen from the dosing chamber 4 and the opening 2a connecting the dosing chamber 4 and the discharge wall 1a of the container 1. The oxygen is flushed-out via the over-pressure valve 6 of the support 9. During the activation of the injection means 5, the actuation means 13 are preferably stopped in order to hold the piston 7 at this shown intermediate position. In an alternative embodiment, the injection means 5 may as well be activated during the lifting of the first piston 7 and preferably stopped before the opening means 3 of the first piston 7 contact the discharge wall 1a of the container 1.

Figure 4C:
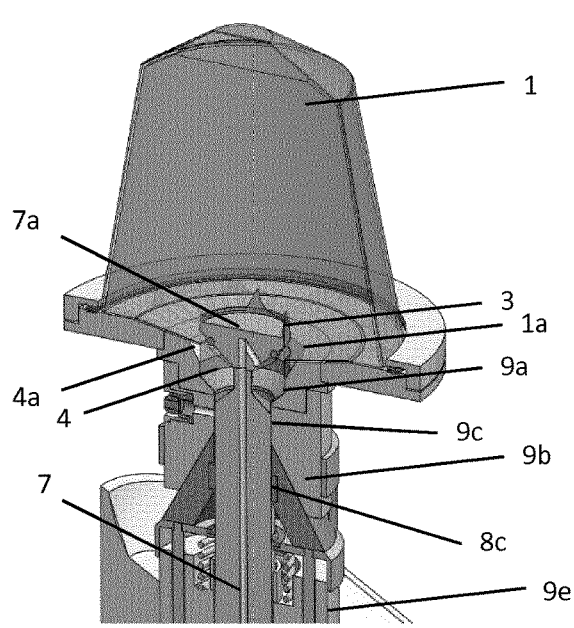

In the next step the actuator means 13 further lift the first piston 7 into its extended position as shown in FIG. 4c. Thereby, the opening means 3 arranged on the top portion 7a of the piston 7 contact the discharge wall 1a of the container 1 for opening it. It is to be understood that the term "opening" may encompass any permanent opening such as by perforation, cutting, tearing etc.

In the shown extended position of the first piston 7, a portion of food product will flow from the container 1 through the created opening in the discharge wall 1a into the dosing chamber 4. The flow of the food product into the dosing chamber 4 is driven by gravity. In this position, the dosing chamber 4 and any space between the container 1 and the interior of the support 9 is sealed by the top portion 8a of the second piston 8 being held in its initial biased position against the lower seat 9b of the support 9.

In a next step, the dosing chamber 4 is closed again by lowering the first piston 7 back into its biased position. This may be obtained e.g. by the actuating means 13 disengaging a protruding portion of e.g. a cam drive 13a from the contact surface 7e of the piston 7. The force of the biasing member 11b will thus bring the piston 7 back to its initial biased position as shown in FIG. 4d.

In a next step, the second piston 8 is lowered from its initial biased position into a retracted position as shown in FIG. 4e. This may be obtained by the actuating means 13 engaging a protruding portion of e.g. a cam drive 13a with a contact surface of the lower base plate 8f of the piston 8. Due to the lowering of the piston 8, the top portion 8a is disengaged from the lower seat 9b of the support 9 and thus the dose of food product held within the dosing chamber 4 can flow downwards along the cone-shaped top portion 8a and into a dispensing area 14 such as a coffee slide. Thereby, the openings 8e in the cage 8b of the piston 8 enable a free flow of food product from the dosing chamber 4 to the dispensing area 14.

After the dosing chamber 4 is emptied, the dosing chamber 4 is closed again by lifting the second piston 8 back into its biased position. This may be obtained e.g. by the actuating means 13 disengaging a protruding portion of e.g. a cam drive 13a from the base plate 8f of the piston 8. The force of the biasing member 11a will thus bring the piston 8 back to its initial biased position as shown in FIG. 4a.

Before the next dispensing process, the dosing chamber 4 is flushed again with inert gas such as to expel any remaining oxygen from the dosing chamber 4. The next dispensing process may then be started as described with respect to FIGS. 4c to 4e. It will be understood that the initial flushing of the area provided between the dispensing chamber 4 and the sealed container 1 as described with respect to FIG. 4b does not necessarily have to be carried out between consecutive dispensing processes.

Figure 5:
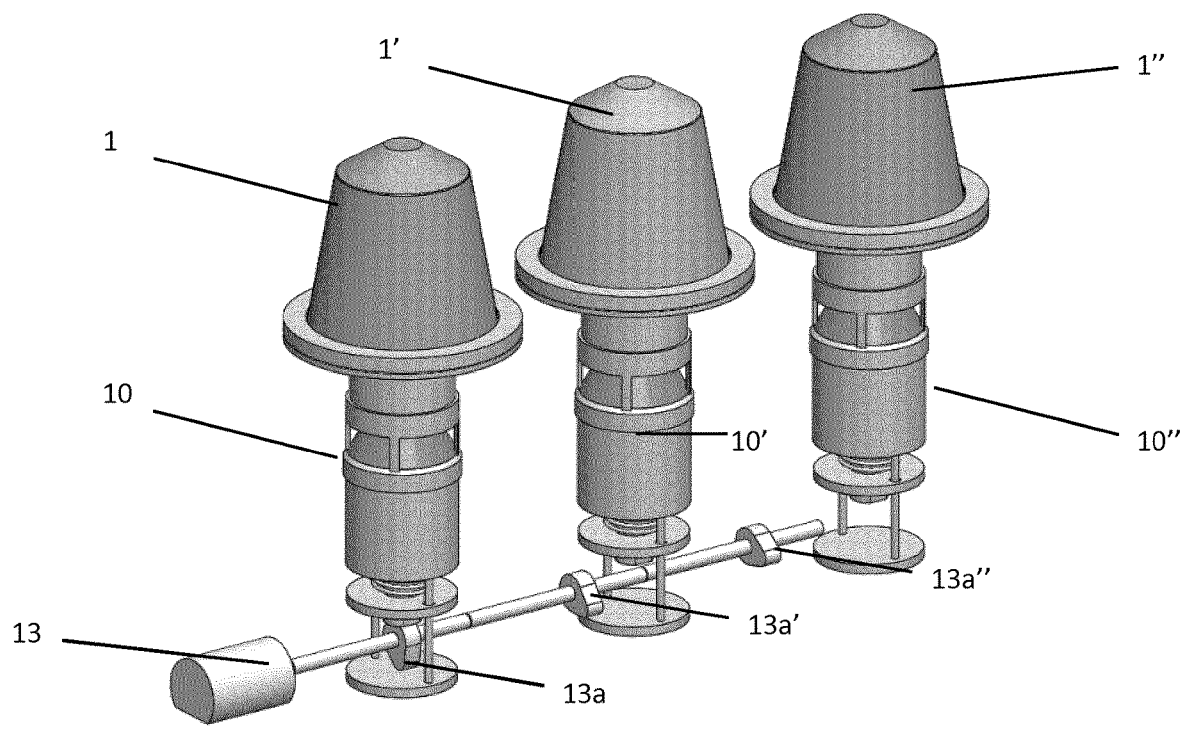
FIG. 5 relates to an arrangement of a plurality of dispensing devices actuated by a common actuator.

FIG. 5 relates to a further embodiment according to the invention. Therein, at least two or more dispensing devices 10,10',10" are arranged next to each other and may be actuated by means of a common actuator 13. Thereby, the actuator 13 may comprise a motor connected to a dedicated cam shaft which cam drives 13a,13a',13a" that enable the actuation of the respective dispensing devices in a sequential manner. For this purpose, the respective cam drives 13a, 13a',13a" are preferably arranged rotationally off-set with respect to each other at a common axis connected to the motor. In such embodiment, the dispensing devices 10 are preferably connected to different containers 1,1',1" which hold different food products to be dispensed.

Figure 6:
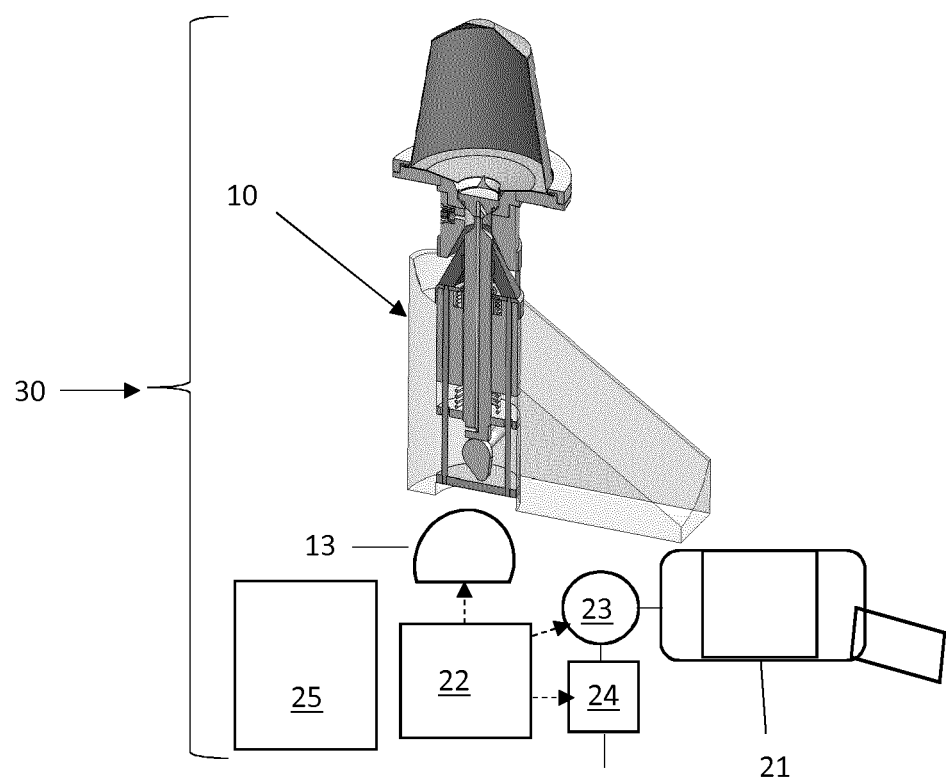
FIG. 6 relates to a beverage preparation machine, e.g., coffee machine, comprising a dispensing device of the invention.

FIG. 6 relates to a beverage preparation machine 30 such as a coffee machine comprising a dispensing device 10 or a plurality of dispensing devices of the invention. The machine comprises a brewing unit 21 arranged for receiving doses of a food product, e.g. roast and ground coffee dispensed from the dispensing device 10 or doses of different food products of different types, e.g., different coffee blends, from a plurality of dispensing devices as in FIG. 5. The machine comprises a control unit 22 arranged, as known per se, for actuating the different components of the machine such as the water heater, pump and receive instructions from the user such as via a user interface. The control unit 22 is further arranged for controlling the actuator 13 (eventually the common actuator of FIG. 5) so as to dispense one or more doses in the brewing unit depending on the type of beverage to be prepared (e.g. ristretto, espresso, machiatto, double-lungo). As it is known per, the control unit also controls the actuation of a pump 23 supplying liquid (e.g. water) to the brewing unit for mixing with the food product and the actuation of a liquid heater 24 for supplying such liquid at a suitable brewing temperature to the brewing unit. The number of doses of food product for each type of beverage can be determined by the control unit storing a plurality of beverage types and instructions related thereto, e.g. in a memory, and by selecting the proper type from the plurality of beverage types and controlling the preparation by following the instructions related to such beverage type. In particular, each type of beverage corresponds to a defined number of doses (n) with such number being a natural whole number (e.g., n=1, 2 or 3, etc.). Accordingly, the container is arranged for storing a number of dose which is equal or superior to a multiple of a dose of the dosing chamber. For instance, when the dosing chamber is arranged for holding x grams (e.g. x=3 grams) of food product, the container is arranged for holding an amount of food product which is sufficient for dispensing at least y.n.x (e.g. with y=5, 10, 15 or 20, with n=1, 2, 3 or a higher whole number and x=3 grams).

The control unit stores beverage types and sets of instructions related thereto; each type and set of instructions corresponding to a defined whole number of doses of food product. The selection of the beverage type linking to the beverage type can be performed via a user interface 25 of the machine.

The invention claimed is:

1. A dispensing device for dispensing a food product in powder form from an exchangeable multi-dose container, the dispensing device comprising:
    a support with a seat for removably supporting the exchangeable multi-dose container,
    a sealable dosing chamber for dosing and holding a dose of food product dispensed from the exchangeable multi-dose container,
    an oxygen reducing member designed for reducing the oxygen level in the sealable dosing chamber,
    a first piston arranged to move relative to the support of the dispensing device, and configured to at least partially enclose the sealable dosing chamber in an initial sealingly engaged position of the first piston with the support,
    the first piston being designed for opening the exchangeable multi-dose container by moving relative to the support, and for enabling the sealable dosing chamber to be charged with the dose of food product in a sealingly disengaged position of the first piston with the support, and
    the first piston comprises or being associated with an opening member protruding from or forming a top portion of the piston and designed to open a discharge wall of the container.

2. The dispensing device of claim 1 further comprising a second piston axially moveable relative to the first piston, and the second piston being designed for selectively dispensing the dose of food product from the sealable dosing chamber in a sealingly disengaged position of the second piston relative to the support or relative to the first piston.

3. The dispensing device of claim 2, wherein the first and second pistons are designed for being axially moved independent from each other and/or alternately by dedicated actuator means.

4. The dispensing device of claim 2, wherein the first piston is an inner piston axially movable through a guiding channel of the second piston.

5. The dispensing device of claim 2, wherein the sealable dosing chamber is delimited by the first and second pistons in their initial sealingly engaged positions with the support.

6. The dispensing device of claim 2, wherein the first and second pistons are respectively engaged against an upper seat and lower seat of the support in a sealed manner such as to delimit the sealable dosing chamber.

7. The dispensing device of claim 2, wherein the sealingly disengaged position of the second piston relative to the support or relative to the first piston is a retracted position.

8. The dispensing device of claim 1, wherein the first piston comprises an annular recess arranged between a top portion and a base portion of the first piston, partially delimiting the sealable dosing chamber.

9. The dispensing device of claim 1, wherein the first piston comprises an injection member extending through the first piston and being in fluid communication with the sealable dosing chamber.

10. The dispensing device of claim 1, wherein the support comprises an over-pressure valve for allowing excess gas to be flushed out of the sealable dosing chamber.

11. The dispensing device of claim 1 further comprising a connection member for sealingly connecting the discharge wall of the exchangeable multi-dose container to the seat of the dispensing device.

12. The dispensing device of claim 1, wherein the sealingly disengaged position of the first piston with the support is an extended position.

13. A beverage machine comprising at least one dispensing device for dispensing a food product in powder form from an exchangeable multi-dose container,
    the device comprising a support with a seat for removably supporting the container,
    a sealable dosing chamber for dosing and holding a dose of food product dispensed from the container,
    an oxygen reducing member designed for reducing the oxygen level in the dosing chamber,
    the device further comprising at least one piston arranged to move relatively relative to the support of the device, and configured to at least partially enclose the dosing chamber in an initial sealingly engaged position of the piston with the support, and
    the piston being designed for opening the container by moving relative to the support and for enabling the dosing chamber to be charged with the dose of food product in a sealingly disengaged position of the piston with the support,
    the piston comprises or being associated with an opening member protruding from or forming a top portion of the piston and designed to open a discharge wall of the container.

14. The beverage machine according to claim 13, wherein the beverage machine comprises a brewing unit for preparing the beverage from the dosed food product and a control unit for controlling actuation of an actuating member of the dispensing device, the actuating member to move the piston axially, the control unit being arranged for repeatedly controlling the actuating member for adjusting a number of doses dispensed to the brewing unit according to a beverage type received by the control unit.

15. A method for dispensing a dose of food product in powder form from a container comprising the steps of:
   providing a dispensing device for dispensing a food product in powder form from an exchangeable multi-dose container,
   the device comprising a support with a seat for removably supporting the container,
   a sealable dosing chamber for dosing and holding a dose of food product dispensed from the container,
   an oxygen reducing member designed for reducing the oxygen level in the dosing chamber,
   the device further comprises at least one piston arranged to move relative to the support of the device, and configured to at least partially enclose the dosing chamber in an initial sealingly engaged position of the piston with the support, and
   the piston being designed for opening the container by moving relative to the support and for enabling the dosing chamber to be charged with the dose of food product in a sealingly disengaged position of the piston with the support, the piston comprises or being associated with an opening member protruding from or forming a top portion of the piston and designed to open a discharge wall of the container
   reducing the oxygen level of the dosing chamber of the device,
   moving at least one piston from its initial sealingly engaged position to its sealingly disengaged position relatively towards a discharge wall of the container such as to open the discharge wall of the container and to establish a food product flow communication between the container and the dosing chamber,
   closing the dosing chamber by bringing the at least one piston back to the initial sealingly engaged position,
   opening the dosing chamber to establish a food product flow communication between the dosing chamber and a dispensing area of the device such as to dispense the dose of food product from the dosing chamber to a dispensing area.

16. The method according to claim 15, wherein the opening of the dosing chamber is performed by moving a second piston from an initial sealingly engaged position relative to the support or a first piston to a retracted and sealingly disengaged position relative to the same to establish a food product flow communication between the dosing chamber and the dispensing area of the device.

* * * * *